United States Patent [19]

Giammarra

[11] 4,317,954

[45] Mar. 2, 1982

[54] ELECTRICAL BOXES AND ACCESSORY THEREFORE

[76] Inventor: John R. Giammarra, 712 Frann Rd., Toms River, N.J. 08753

[21] Appl. No.: 88,145

[22] Filed: Oct. 25, 1979

[51] Int. Cl.³ .............................................. H02G 3/08
[52] U.S. Cl. ........................................ 174/53; 174/54; 220/3.2; 248/544
[58] Field of Search .............................. 174/53, 54, 57; 220/3.2, 3.3, 3.4, 3.5, 3.6, 3.7, 3.8, 3.9, 3.92, 3.94; 248/544

[56] References Cited

U.S. PATENT DOCUMENTS

| | | | |
|---|---|---|---|
| 855,550 | 6/1907 | Atkinson | 220/3.94 |
| 948,438 | 2/1910 | Ziegler | 220/3.4 X |
| 1,822,128 | 9/1931 | Clayton | 220/3.2 X |
| 2,284,466 | 5/1942 | Zelt | 220/3.3 X |
| 2,804,116 | 8/1957 | Van Niel et al. | 220/3.8 X |
| 3,268,189 | 8/1966 | Ducharme | 220/3.3 X |

Primary Examiner—B. A. Reynolds
Assistant Examiner—D. A. Tone
Attorney, Agent, or Firm—Gordon W. Kerr

[57] ABSTRACT

A metal bracket which can be quickly and easily attached to an installed electrical box to replace an electrical device mounting ear which has been accidentally knocked off after installation of the box.

6 Claims, 4 Drawing Figures

U.S. Patent          Mar. 2, 1982          4,317,954
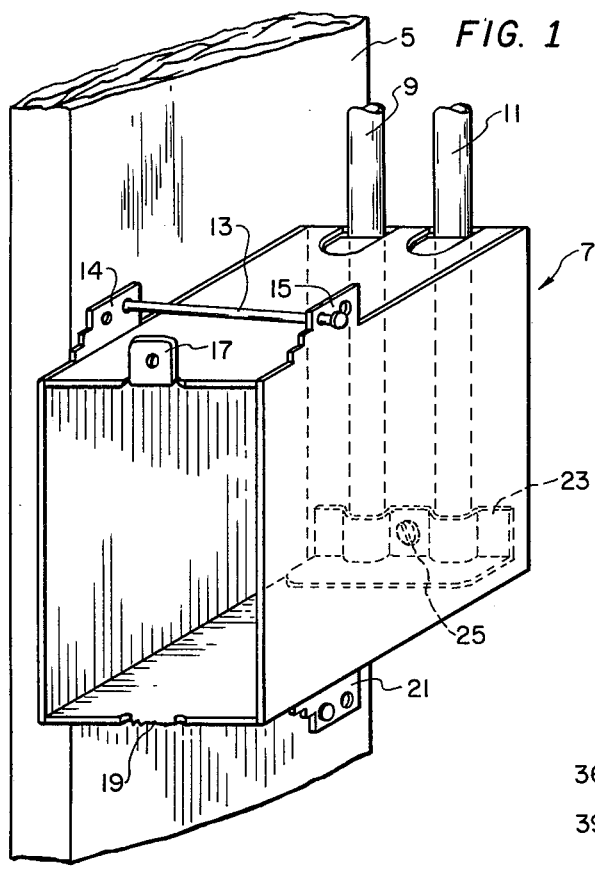
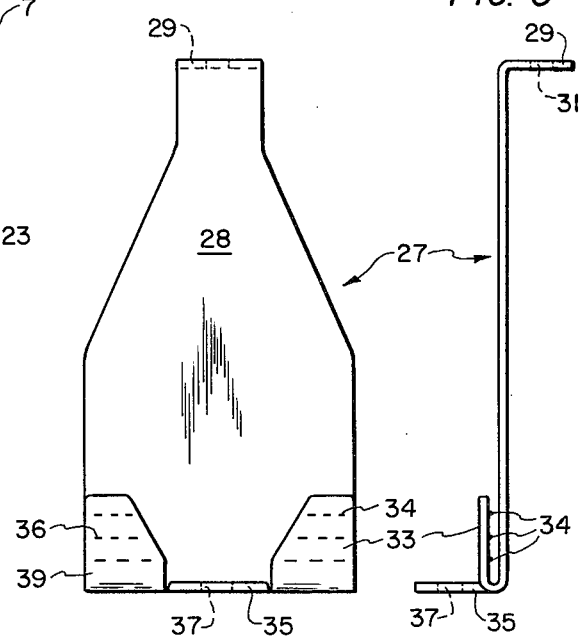
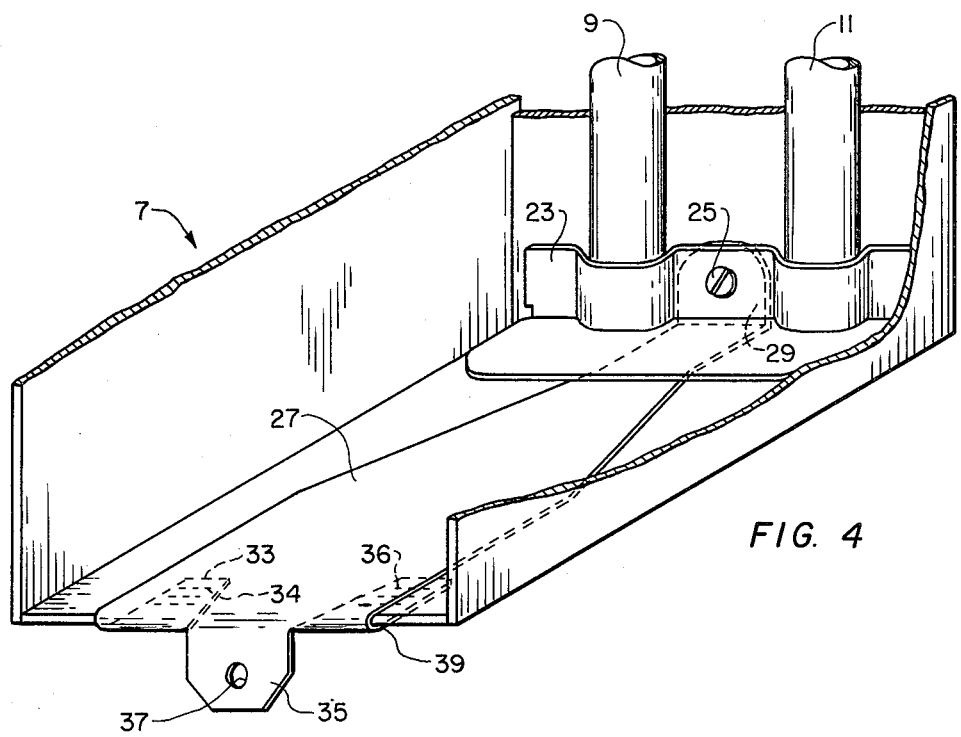

ELECTRICAL BOXES AND ACCESSORY THEREFORE

BACKGROUND OF THE INVENTION

The field of this invention is electrical boxes, and more particularly metallic electrical boxes of the new-construction type. The invention involves a means for attaching a replacement mounting ear to an installed box of this type which has been damaged by subsequent construction. Prior to the present invention, damage of this type to an installed box usually required replacement thereof with a so-called old-work box which is designed to be installed after sheetrocking. These old-work boxes are usually equipped with a means for frictionally engaging the adjacent Sheetrock to wedge the replacement box in place. Thus, in addition to saving the higher cost of a replacement old-work box, the repaired new-construction box resulting from the present invention will be more securely attached to the wall.

SUMMARY OF THE INVENTION

New-construction electrical boxes are usually installed in the interior walls of buildings while under construction after the framing has been erected, but before the insulation and wall board (Dry Wall, Sheetrock or the like) has been installed. Such boxes are usually constructed of steel or plastic. The present invention is applicable to metallic or steel boxes of this type, particularly those which include electrical device mounting ears which usually project upward from the top of the box and downward from the bottom thereof, at the open side of the box. Since these mounting ears must be approximately flush with the finished wall, the box must project outward from the stud or frame on which it is mounted by the approximate thickness of the Sheetrock. These projecting mounting ears are susceptible to damage by the subsequent installation of the sheetrock and/or insulation. Since the sheetrock must be nailed to the same frame which supports the box, a misdirected hammer blow intended to secure the sheetrock often will knock off a mounting ear. The present invention comprises a metal bracket which can be easily and securely attached to such a damaged box to provide a replacement for the missing ear. The structure and method of applying this replacement bracket will become apparent from the following detailed description and drawings.

BRIEF DESCRIPTION OF THE DRAWINGS

FIG. 1 shows an installed electrical box with one mounting ear missing.

FIGS. 2 and 3 show plan and side views respectively of a bracket which includes a replacement for the missing ear.

FIG. 4 is an enlarged view of the lower portion of the box of FIG. 1, showing the bracket of FIGS. 2 and 3 mounted thereon to provide a replacement ear in accordance with the present invention.

DETAILED DESCRIPTION OF A PREFERRED EMBODIMENT

In FIG. 1 there is shown a new-construction, steel electrical box 7 which has been installed in a wall under construction. The illustrated box is one which is attached to the wall by means of two nails. As seen in FIG. 1, the upper mounting nail 13 passes through holes in upstanding flanges 14 and 15 and is driven into the vertical frame or stud 5. The lower mounting nail 21 is similarly arranged to pass through holes in a pair of flanges and be driven into the same frame. The box 7 also includes a pair of electrical cables 9 and 11, a cable clamp 23 and a cable clamp screw 25, at the lower rear. A second similar cable clamp (not shown) would normally be located at the top rear of the box. The open, front face of the box 7 includes an electrical device mounting ear 17 at the top thereof. Normally there would be a second such mounting ear at the bottom of the front face thereof, but this mounting ear has been accidentally knocked off, leaving a jagged portion, indicated at 19.

Such boxes and their cables are normally installed before the insulation and Sheetrock, and the electrical device, normally a switch or receptacle which is to be housed in the box, is usually installed and hooked up after the Sheetrock and sometimes after the decoration thereof. As can be seen in FIG. 1, the box is installed so that the front face thereof projects out from the frame or stud 5 a sufficient distance to accommodate the Sheetrock. A rectangular hole just slightly larger than the front face of the box is cut in the Sheetrock during installation, and the sheetrock is then nailed to the frames with the rectangular hole overlying the box. If a box mounting ear is knocked off by an inept sheetrocker as he is putting the last nail therein, it was, prior to the present invention, necessary to first remove the damaged box through a hole not much bigger than itself, after removing the mounting means such as the nails 13 and 21 of FIG. 1 which secure it to the frame. As stated above, it was then necessary to wedge in an old-work box to accommodate the electric device, and re-insert the electric cable. This was an expensive and time consuming procedure, and resulted in a less than satisfactory result since the old-work box was not as securely attached to the frame as the one it replaced.

FIGS. 2 and 3 show a replacement metallic bracket 27 which may be quickly and easily securely attached to a damaged box such as the one in FIG. 1 to provide a replacement for the missing ear. The bracket 27 comprises a flat main body portion 28 which is generally triangular. The apex of the triangle is bent 90 degrees to form an ear or tab 29. Tab 29 has a hole 31 therein. The base of the triangle comprises three separate bent-over sections. At the middle of said base is the replacement mounting ear 35, which is formed by bending the middle section of the bracket 27 90 degrees in the opposite direction from the bend which formed the tab 29. On either side of the replacement ear 35 are a pair of tabs 33 and 39 which are bent-back 180 degrees from the main body of bracket 27 and are designed to clip over the top or bottom edge or wall of a damaged box to aid in holding the bracket in place, as illustrated in FIG. 4. The tabs 39 and 33 may be provided with a series of grooves and ridges indicated at 34 and 36. These ridges will provide a firm grip on the box 7 when the bracket is installed.

As shown in FIG. 4, the tab 29 is designed to fit underneath and behind the cable clamp 23 and to be held down by the same screw 25 which holds the cable clamp down. The rear of the box 7 includes a tapped hole, not shown, to accommodate the 10–32 size cable clamp screw. The hole 31 in tab 29 is designed to accommodate the outside diameter of the cable clamp screw. The distance between the replacement ear 35 and the tab 29 is made approximately equal to the inside depth of the box to which the bracket is to be applied.

In order to apply the bracket of FIGS. 3 and 4 to the damaged box of FIG. 1, the cable clamp 23 is removed, the bracket is clipped onto the inside top or bottom edge or wall of the damaged box by means of the tabs 33 and 39, and the hole 31 in tab 29 is lined up with the tapped cable clamp screw hole at the rear of the box. The cable clamp 23 is then re-inserted over the rear part of the replacement bracket and the cable clamp screw re-inserted, so that it now clamps both the cable clamp and the rear end of the replacement bracket 27. The tabs 33 and 39 may be crimped to force the ridged portions 34 and 36 thereof into secure engagement with the wall of the electrical box 7.

While the invention has been described in connection with a preferred embodiment, other embodiments will occur to those skilled in the art without departing from the inventive concepts disclosed herein, hence the invention should be limited only by the scope of the appended claims.

I claim:

1. A new- construction metal electrical box of the type originally having electrical device mounting ears, said box including cable clamps at the rear thereof secured to said box by cable clamp screws, one of said mounting ears having been knocked off said box, said box including a replacement for said mounting ear comprising a metal bracket clipped onto the wall of said box on each side of the former location of said knocked-off ear, and secured to the rear of said box by one of the cable clamp screws thereof.

2. The electrical box of claim 1 wherein said metal bracket comprises a main body portion with a 90 degree bent-over tab at the center of one end thereof and a 90 degree bent-over replacement mounting ear at the center of the other end of said main body, said tab and said mounting ear being bent-over in opposite directions, and wherein said bracket is clipped to said wall of said box by a pair of bent-back sections on each side of said replacement mounting ear.

3. The electrical box of claim 2 wherein the distance between said replacement mounting ear and said tab is approximately equal to the inside depth of said box.

4. A metal bracket adapted to be applied to a metallic electrical box of the new-construction type, from which one of the electrical device mounting ears is missing, comprising, a main body portion generally in the shape of a triangle, with a 90 degree bent-over tab at the apex of said triangle, a hole in said tab, a replacement electrical device mounting ear at the center of the base of said triangle, said ear being bent-over 90 degrees in the opposite direction from said tab at the apex of said triangle, and a pair of bent-back portions on each side of said replacement ear, said bent-back portions being adapted to clip over the edge of said electrical box on each side of said missing mounting ear to aid in securing said metal bracket thereto, and wherein said hole in said tab at the apex of said triangle is large enough to accommodate the outside diameter of the screw used to hold down the cable clamp of said electrical box, and in which said electrical device mounting ear has a threaded hole therein used for securing an electrical device to said electrical box.

5. The metal bracket of claim 4 wherein the distance from the tab at the apex of said triangle to the electrical device mounting ear is approximately equal to the inside depth of said electrical box.

6. A metal bracket comprising a flat main body portion with a 90 degree mounting tab at one end thereof and a replacement electrical device mounting ear with a hole therein at the center of the other end thereof, and a pair of bent-back sections on each side of said mounting ear, the distance between said mounting tab and said mounting ear being approximately equal to the inside depth of an installed new construction electrical box from which one of the mounting ears is missing, whereby said bracket may be quickly and easily applied to said installed electrical box to provide a replacement for said missing electrical device mounting ear, and wherein said mounting tab and said mounting ear are bent 90 degrees from said main body portion, but in opposite directions.

* * * * *